United States Patent [19]
Muska et al.

[11] Patent Number: 4,946,247
[45] Date of Patent: Aug. 7, 1990

[54] FIBER OPTIC BYPASS SWITCH

[75] Inventors: Willis M. Muska, Roanoke, Va.; Philip R. Couch, Cambridge, England

[73] Assignee: FiberCom, Inc., Roanoke, Va.

[21] Appl. No.: 250,563

[22] Filed: Sep. 29, 1988

[51] Int. Cl.$^5$ .............................................. G02B 6/36
[52] U.S. Cl. ................................................ 350/96.20
[58] Field of Search ................ 350/96.20, 96.21, 96.22

[56] References Cited

U.S. PATENT DOCUMENTS

| | | | |
|---|---|---|---|
| 4,033,669 | 7/1977 | Hanson | 350/96.20 |
| 4,057,719 | 11/1977 | Lewis | 250/227 |
| 4,082,435 | 4/1978 | Zeitz | 350/269 |
| 4,087,155 | 5/1978 | Deacon | 350/96.21 |
| 4,088,387 | 5/1978 | Lewis | 350/96.15 |
| 4,148,558 | 4/1979 | Schuck | 350/96.20 |
| 4,150,870 | 4/1979 | d'Auria | 350/96.16 |
| 4,193,662 | 3/1980 | Hara | 350/96.15 |
| 4,229,068 | 10/1980 | Hodge et al. | 350/96.20 |
| 4,239,332 | 12/1980 | Inbar | 350/96.20 |
| 4,398,791 | 8/1983 | Dorsey | 350/96.20 X |
| 4,401,365 | 8/1983 | Mizokawa et al. | 350/96.20 |
| 4,407,562 | 10/1983 | Young | 350/96.20 |
| 4,496,211 | 1/1985 | Daniel | 350/96.20 |
| 4,593,971 | 6/1986 | Clement et al. | 350/96.20 |
| 4,652,081 | 3/1987 | Fatatry | 350/96.20 |
| 4,691,986 | 9/1987 | Aberson, Jr. et al. | 350/96.20 X |

FOREIGN PATENT DOCUMENTS 1946693 8/1970 Fed. Rep. of Germany .

Primary Examiner—Frank Gonzalez
Assistant Examiner—Akm E. Ullah
Attorney, Agent, or Firm—Finnegan, Henderson, Farabow, Garrett & Dunner

[57] ABSTRACT

A rotary optical fiber switch including first and second bodies positioned in virtually abutting relation and each having a bore adapted to receive a plurality of optical fibers dimensioned to fit in contiguous relation with each other and the inner wall of the bore for precise positioning wherein the bore, the ends of the optical fibers being in substantially coplanar relation with the abutting ends of the first and second bodies, the first body being fixed and the second body being selectively rotatable between predetermined angular positions for positioning the fibers in optical-transmission alignment.

20 Claims, 5 Drawing Sheets

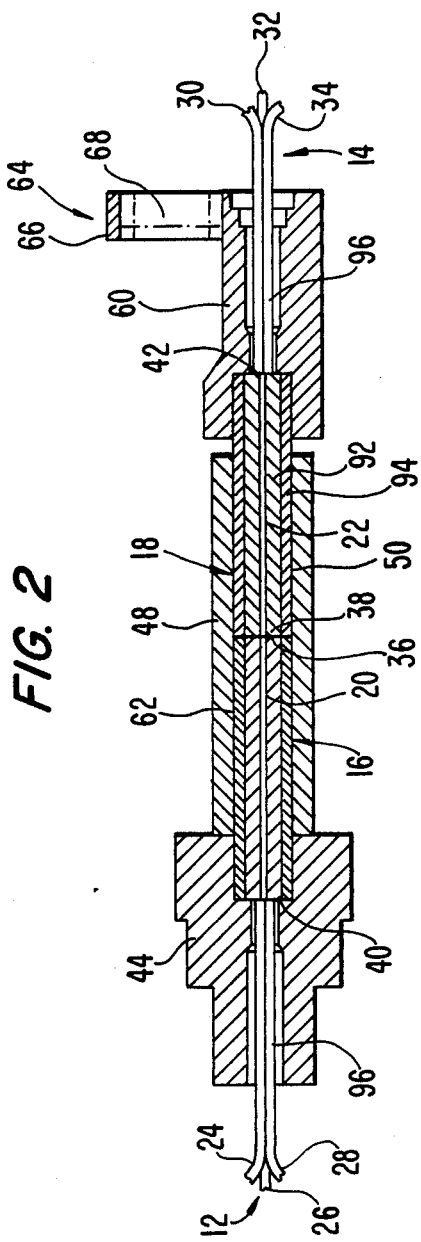
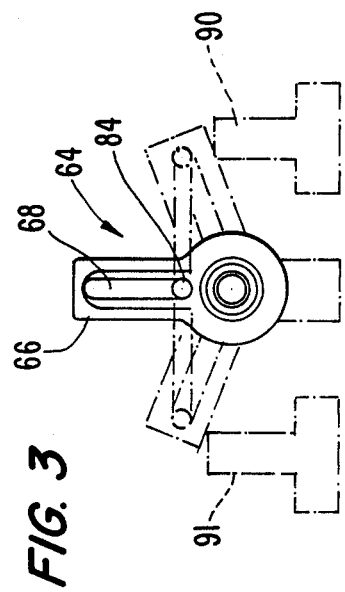
FIG. 2
FIG. 3

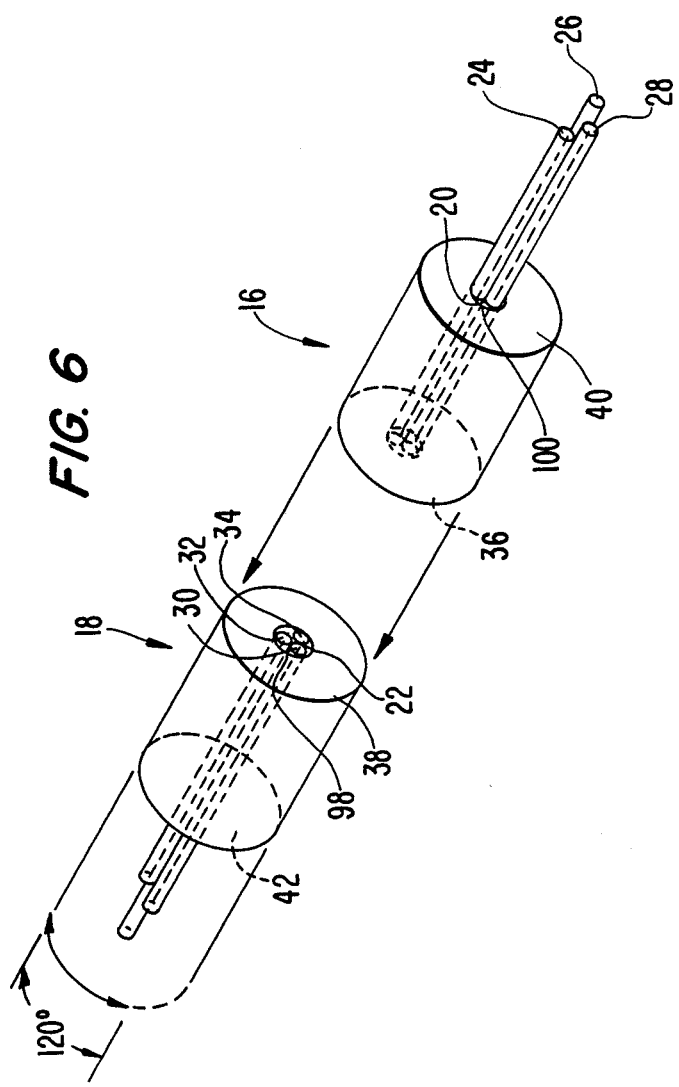

FIBER OPTIC BYPASS SWITCH

BACKGROUND OF THE INVENTION

1. Field of the Invention

The present invention relates to a fiber optic bypass switch for selectively controlling the switching of an optical signal from one optical fiber to another optical fiber.

2. Description of the Related Art

Fiber optic switches have been developed for selectively switching optical signals from one fiber to another fiber. In particular, rotary fiber optic bypass switches are known wherein one group of optical fibers is rotated to change its alignment with a corresponding group of fibers. Known rotary fiber optic bypass switches are deficient in that they lack precision in the switching operation. A precise arrangement of the communicating fibers is important to minimize optical throughput loss in both the normal and bypass mode of the fiber optic bypass switch. Additionally, the known switches require expensive tooling and are not compact.

For example, one rotary fiber optic bypass switch has a guide rod along the central axis of the two groups of fibers to align the two groups of fibers. With this switch, the fibers in each group must then be precisely individually positioned around the guide rod in a symmetric arrangement, resulting in a less compact, less precise switching arrangement.

SUMMARY OF THE INVENTION

The present invention overcomes the problems and disadvantages of the prior art by providing a precise, compact and economical fiber optic bypass switch.

Thus, it is an object of the invention to provide a fiber optic bypass switch having high precision in the switching operation.

A further object of the invention is to provide a compact fiber optic bypass switch.

Another object of the invention is to provide an inexpensive fiber optical bypass switch.

To achieve the objects and in accordance with the purpose of the invention, as embodied and broadly described herein, the rotary optical fiber switch of the invention comprises: first and second bodies each having first and second ends and a single axial bore extending therebetween, each bore having an inner wall and being adapted to receive a plurality of optical fibers dimensioned to fit in contiguous relation with each other and said inner wall for precise positioning within said bore, and said bore being adapted to locate first ends of the fibers in substantially coplanar relation with the respective first end of the first and second bodies, means for mounting the first body in a predetermined orientation, means for positioning the second body in predetermined coaxial relation to the first body, the first ends of the bodies being disposed in virtually abutting relation, the positioning means including means for permitting rotation of the second body about its axis, and means for selectively rotating the second body between predetermined angular positions, the first end of each fiber in the second body being in optical-transmission alignment with the first end of one fiber in the first body in each position.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 is a longitudinal section view of the fiber optic switch shown in FIG. 1.

FIG. 3 is an end view of the rotating cam shown in FIG. 1.

FIG. 6 is a perspective view of certain elements of the fiber connector of FIG. 1 shown schematically to reflect the relative rotation of the elements.

DESCRIPTION OF THE PREFERRED EMBODIMENT

Figure 1:
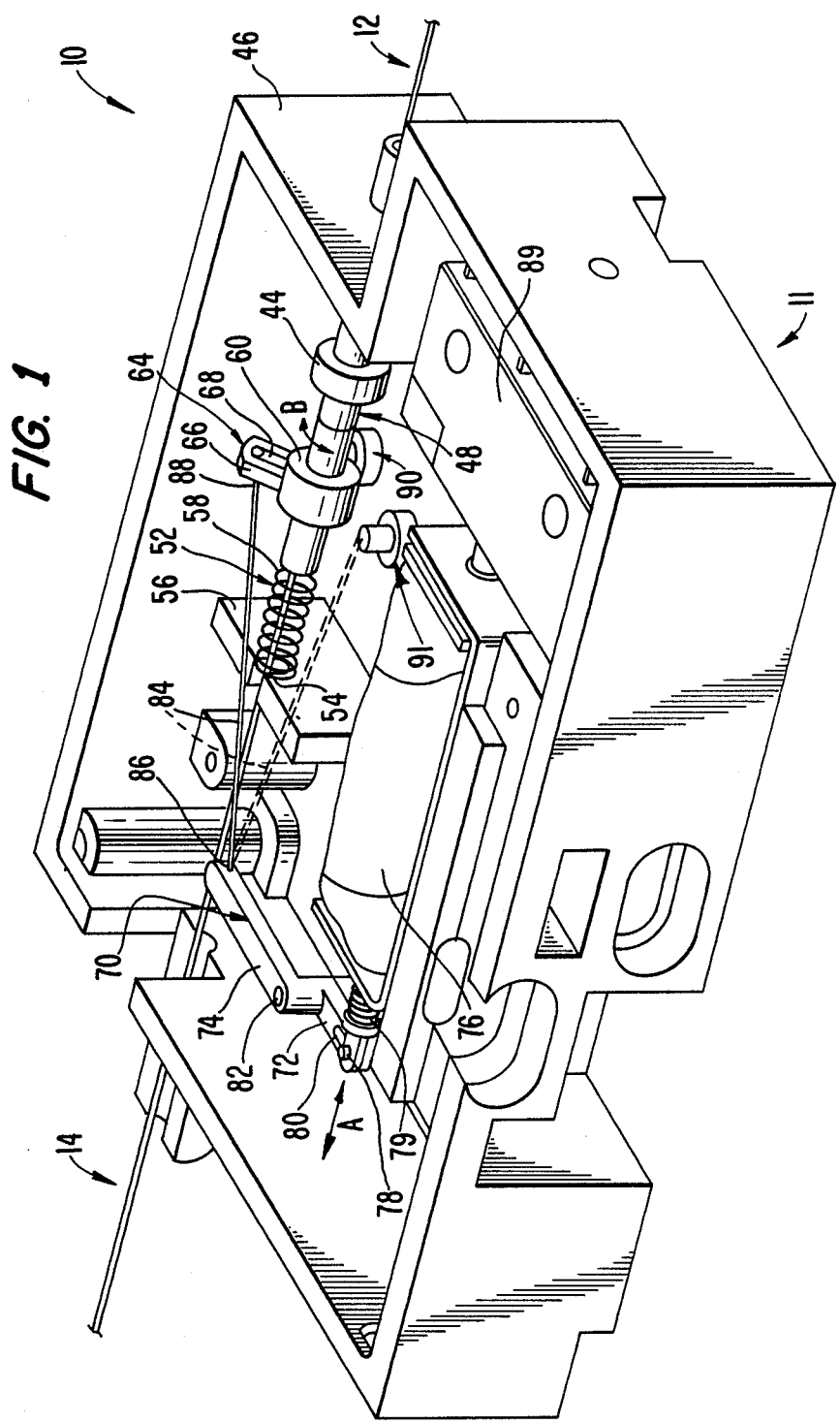
FIG. 1 is a perspective view of an embodiment of the fiber optic switch of the invention.

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, a fiber optic bypass switch is provided for selectively connecting in optical transmission alignment a first group of optical fibers to a second group of optical fibers. As embodied herein and referring to FIGS. 1 and 2, fiber optic bypass switch 10 is provided in housing 11 for aligning a first group of fibers 12 and a second group of fibers 14. In accordance with the invention, the optical fiber switch 10 includes a first body and a second body each having a single axial bore. As embodied herein, first body 16 has axial bore 20 and second body 18 has axial bore 22. Each bore 20, 22 extends between a corresponding first end 36, 38 and second end 40, 42 of first and second bodies 16, 18.

Figure 5E:
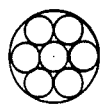
FIG. 5E is a view similar to FIG. 5A and shows another embodiment of the invention wherein seven fibers are arranged in the ferrule.
Figure 5D:
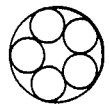
FIG. 5D is a view similar to FIG. 5A and shows another embodiment of the invention wherein five fibers are arranged in the ferrule.
Figure 5C:
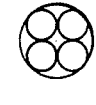
FIG. 5C is a view similar to FIG. 5A and shows another embodiment of the invention wherein four fibers are arranged in the ferrule.
Figure 5B:
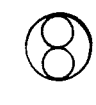
FIG. 5B is a view similar to FIG. 5A and shows another embodiment of the invention wherein two fibers are arranged in the ferrule.
Figure 5A:
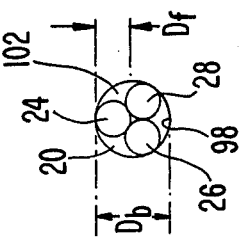
FIG. 5A is an end view of the embodiment and shows three fibers arranged in a bore of a ferrule as seen from line V—V in FIG. 4.

In accordance with the invention, each bore is adapted to receive a plurality of optical fibers dimensioned to fit in contiguous relation with each other and an inner wall of the bore for precise positioning within the bore. As embodied herein, and referring to FIGS. 2 and 4, bore 20 in first body 16 receives the first group of fibers 12 and bore 22 in second body 18 receives the second group of fibers 14. Referring to FIGS. 5A through 5E, each group preferably contains two (2) through five (5) or seven (7) fibers arranged as shown. Preferably, the first group 12 contains three fibers 24, 26, 28, as shown in FIG. 5A, and the second group 14 also contains three fibers 30, 32, 34.

Due to the predetermined dimensions of the optical fibers and the bores 20, 22, which are made to tight dimensional tolerances, the fibers fit snugly in their corresponding bores in a precise, aligned position. The self alignment that occurs when the fibers 24, 26, 28 and 30, 32, 34 are initially inserted in their respective bores 20, 22, eliminates the need to initially align the optical fibers within the first and second bodies.

The diameter $D_b$ of bores 20, 22 depends on the number of fibers, n, positioned in the bores and the diameter of the fibers, $D_f$, and is preferably reflected by the following equation:

$$D_b = D_f + \frac{D_f}{\cos\left(90 - \frac{180}{n}\right)}$$

where $D_b$=diameter of the bores in the first and second bodies $D_f$=diameter of fibers n=number of fibers placed in each of the bores Preferably, the fiber diameter, $D_f$ is a standard diameter of 125 μm.

Figure 4:
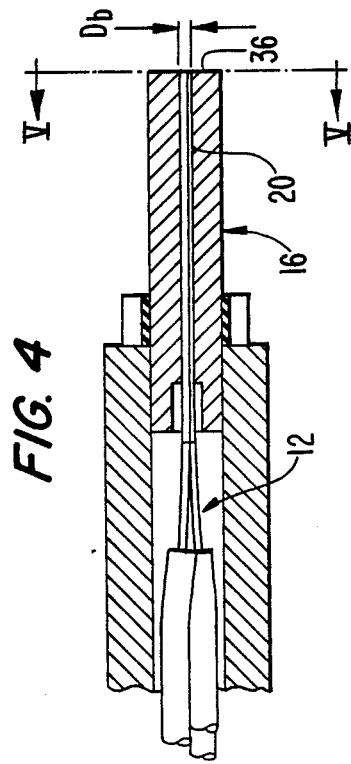
FIG. 4 is an enlarged view of a portion of FIG. 2 and shows a more detailed view of the arrangement of the optical fibers in a ferrule.

Referring to FIGS. 2 and 4, the individual fibers 24, 26, 28 and 30, 32, 34, each having a glass core and an outer glass cladding integral with the glass core, are inserted in corresponding bores 20, 22 of the first and second bodies 16, 18. Preferably, a portion of each of the optical fibers 24, 26, 28 and 30, 32, 34 disposed outside of the respective bores 20, 22 of the first and second bodies 16, 18 includes a protective plastic coating 96 for minimizing the risk of scratching or otherwise damaging the fibers. This protective coating is not provided on the portion of each of the optical fibers 24, 26, 28 and 30, 32, 34, disposed in the first and second bodies 16, 18, since the coating does not have the requisite dimensional precision necessary to achieve precise positioning of the fibers within their respective bores.

As embodied herein, the optical fiber switch further comprises securing means for securing the plurality of fibers in the precise position assumed by the fibers upon insertion within the corresponding bore. Preferably, the securing means includes an adhesive 102 (FIG. 5A) for adhering the exposed outer glass cladding surface of each of the positioned fibers 24, 26, 28 and 30, 32, 34 to adjacent fibers and to the inner wall 98, 100 of the corresponding bore 20, 22. The adhesive 102, which may be, for example, epoxy cement, fills the spaces between fibers 24, 26, 28 and 30, 32, 34 and their corresponding inner walls 98, 100 for adhering each of the optical fibers to adjacent fibers and the corresponding inner wall 98, 100. Preferably, the fibers 24, 26, 28 and 30, 32, 34 are precisely positioned so that each fiber has a central axis that is substantially equidistant from a central axis of the corresponding bore 20, 22.

In accordance with the invention, each bore is adapted to locate first ends of the fibers in substantially coplanar relation with the respective first end of the first and second bodies. As embodied herein, and referring to FIGS. 4 and 6, the first ends of fibers 24, 26, 28 are coplanar with the first end 36 of first body 16 and the first ends of fibers 30, 32, 34 are coplanar with the first end 38 of second body 18. Preferably, after the fibers are placed in corresponding bores 20, 22 the first ends 36, 38 of bodies 16, 18 are ground to make the first ends of the fibers and the first ends of the bodies 16, 18 substantially coplanar. The grinding process actually makes the fibers slightly concave with respect to the first ends 36, 38 of the bodies. Such concavity of the fibers is desirable since the first ends 36, 38 of the first and second bodies are used as contact surfaces during rotation, thereby minimizing the friction between the communicating fibers of the first group 12 and second group 14 and preventing damage to the light transmitting surfaces of the fibers since they do not touch.

In accordance with the invention, means are provided for mounting the first body in a predetermined orientation. As embodied herein, and referring to FIGS. 1 and 2, the mounting means includes a backshell 44 that is fixedly mounted in a bore of a wall portion 46 of housing 11.

In accordance with the invention, means for positioning the second body in predetermined coaxial relation to the first body are provided so that the first ends of said bodies are disposed in virtually abutting relation. Means for permitting rotation of the second body about its axis are also provided. As embodied herein, and referring to FIGS. 1 and 2, the positioning means and the means for permitting rotation of the second body includes a cylindrical sleeve or collar 48 having an axial bore 50 for guidingly receiving first end 36 of first body 16 and first end 38 of second body 18 in virtually abutting relation. As shown in FIGS. 1 and 2, collar 48 surrounds portions of first body 16 and second body 18, including first ends 36, 38 of first and second bodies 16, 18. The inner wall of bore 50 acts as a bearing surface for rotation of second body 18, permitting second body 18 to rotate freely within collar 48 while insuring axial alignment of second body 18 with respect to first body 16. Collar 48 also functions as a support for second body 18 in housing 11.

By using the inner wall of bore 50 in collar 48 and the outer surface of second body 18 as bearing surfaces for aligning the first and second bodies 16 and 18, the central portion of the switch is made available for receiving the fibers. This arrangement allows the fibers to be more precisely and easily aligned by packing them tightly in a central bore, rather than individually positioning the fibers around a central guide rod, as in the prior art.

The positioning means further includes means for axially biasing the second body 18 toward the first body 16 in virtually abutting relation. Preferably, the biasing means includes a spring 52 mounted on one side 54 against a support 56 and on the other side 58 against an end of backshell 60 for biasing the second body 18 toward first body 16. Second body 18 is fixedly received in backshell 60, which is rotatably supported in the housing through the support of second body 18 by collar 48.

Referring to FIGS. 1 and 2, the positioning means further includes means for fixing the cylindrical collar to the first body. As embodied herein, the fixing means includes an adhesive 62, such as epoxy, for fixing cylindrical collar 48 to first body 16. Accordingly, cylindrical collar 48, which surrounds at least portions of the first and second bodies 16, 18, is fixed to the non-rotating first body 16 and permits rotatable second body 18 to rotate within it. In this way, collar 48 axially aligns the first and second bodies 16, 18 with respect to each other.

In accordance with the invention, means for selectively rotating said second body between predetermined angular positions are provided so that the first end of each fiber in the second body is in optical-transmission alignment with the first end of one fiber in the first body in each of said predetermined angular positions. The selective rotating means includes means for rotating said second body and means for stopping rotation of said second body at a predetermined angular position.

As embodied herein, and referring to FIGS. 1-3, the rotating means includes a cam 64 connected to backshell 60 that is fixed to the second body 18 for rotating therewith, means for driving cam 64 and means for operatively connecting the driving means and cam 64. Preferably, cam 64 includes a projection 66 extending radially from backshell 60 and having a radial slot 68 therein.

As embodied herein and referring to FIG. 1, the connecting means includes a two-armed pivoting apparatus 70 connected at one arm 72 to the driving means and connected at the other arm 74 to the cam 64, the driving means pivoting the two-arm pivoting apparatus 70 to thereby rotate the cam 64. Referring to FIG. 1, the connecting means further includes an extension 84 having one end 86 fixed to the other arm 74 of the pivoting apparatus 70 and the other end 88 movably disposed in radial slot 68 of cam 64. Preferably, extension 84 is a non-flexible wire. The pivoting of pivoting apparatus 70 causes extension 84 to slide within slot 68 and rotate the cam 64 and the second body 18 fixed thereto, as shown in FIG. 3.

As embodied herein, the driving means is a solenoid 76 having a pin 78 movably disposed in a slot 80 in arm 72 of the pivoting apparatus 70 for pivoting apparatus 70 around pivot pin 82. In the non-actuated state of solenoid 76, a spring 79 on the solenoid biases pin 78 away from solenoid 76, in the direction shown by the left head of arrow A in FIG. 1. Arm 74 of pivoting apparatus 70 is pivoted toward cam 64 causing extension 84 to rotate cam 64 counter-clockwise, as viewed from the perspective shown in FIG. 3 and as indicated by the left head of double headed arrow B in FIG. 1.

Preferably, the driving means further includes a microswitch 89 for reducing the current of solenoid 76 once it is actuated. That is, the current necessary to hold the solenoid in position once it is activated is less than the current necessary to actuate the solenoid. Microswitch 89 is provided to permit a reduction in current once the solenoid is actuated, thereby preserving energy and making the operation of the fiber optic bypass switch 10 more economical.

Referring to FIGS. 1 and 3, and as embodied herein, the stopping means of the selective rotating means includes adjustable stops 90, 91 positioned to abut rotating cam 64 at adjustable predetermined angular positions of cam 64. The stops 90, 91 are adjustable to a particular height, depending on the number of optical fibers in each of first and second bodies 16, 18. For example, when each of the first and second bodies 16, 18 has two optical fibers, as shown in FIG. 5B, stops 90, 91 are adjusted to permit cam 64 to rotate 180°, so that for each actuation of solenoid 76, the cam 64 and the corresponding fibers in second body 18 are rotated 180°. This rotation of the fibers completely switches the alignment between the two fibers in the first body 16 and the two fibers in the second body 18.

Similarly, and as embodied herein in FIGS. 1 and 3, when each of the first and second bodies 16, 18 has three optical fibers 24, 26, 28 and 30, 32, 34, respectively, stops 90, 91 are adjusted to permit cam 64 to rotate 120° between the two end positions defined by stops 90, 91. In the original position of the fiber optic switch 10, cam 64 abuts stop 91. When the alignment of the fibers 24, 26, 28 and 30, 32, 34 must be altered to bypass a failed node, for example, the cam 64 is rotated 120° to abut stop 90. Thus, when cam 64 is rotated 120°, second body 18 connected to backshell 60 rotates 120° and the alignment of the fibers 30, 32, 34 in second body 18 and fibers 24, 26, 28 in first body 16 is changed.

In operation, in the original position of the optical fibers, cam 64 abuts stop 91. The position of extension 84 in the original position is shown in dashed lines in FIG. 1. Spring 79 of solenoid 76 biases cam 64 in this position. When it is necessary to switch the alignment of the optical fibers 24, 26, 28 and 30, 32, 34, solenoid 76 is actuated by passing a current through the solenoid. When solenoid 76 is actuated, pin 78 is pulled in, in the direction indicated by the right head of the arrow A in FIG. 1, to slide within slot 80 of pivot arm 72 and thereby pivot pivoting apparatus 70. Wire extension 84, attached to pivot arm 74 at one end 86 and movable in slot 68 of cam 64 at the other end 88, is moved by the pivoting apparatus 70. Wire extension 84 moves against the inner walls of slot 68 in cam 64 and rotates cam 64 and the connected second body in a clockwise direction (as viewed from the perspective of FIG. 3) toward stop 90, as shown by the right head of double headed arrow B in FIG. 1. Thus, FIG. 1 shows the switch in the activated position. Second body 18 is returned to its original position wherein cam 64 abuts stop 91 when the power is removed from solenoid 76. Spring 79 of solenoid 76 provides the return force for returning cam 64, and thus rotatable second body 18, to the original position.

Referring to FIG. 3, the solid line depicts an upright position of cam 64 wherein wire extension 84 rests in a lower portion of radial slot 68. The dashed lines of FIG. 3 depict end positions of cam 64 when cam 64 abuts stops 90, 91 and fibers 24, 26, 28 and 30, 32, 34 are in positions of alignment.

Referring to FIG. 6, the 120° rotation of second body 18 with respect to the fixed first body 16 between end positions defined by stops 90, 91 causes fibers 30, 32, 34 of second body 18 to align with different ones of fibers 24, 26, 28 in first body 16.

Figure 8:
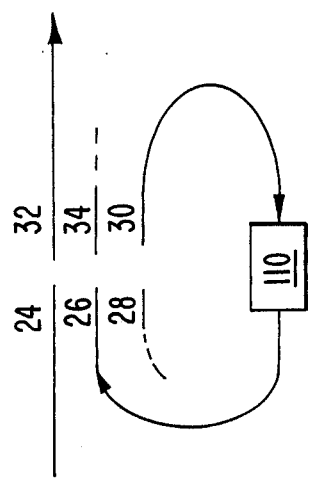
FIG. 8 is a schematic view of the embodiment of FIG. 1 and shows the alignment of optical fibers in a switching position.
Figure 7:
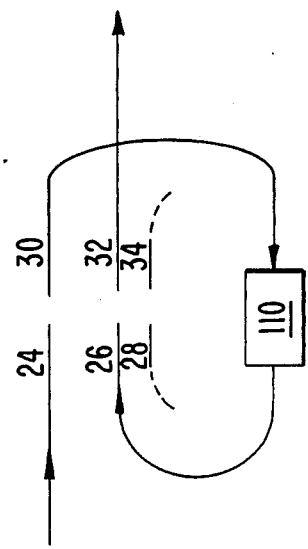
FIG. 7 is a schematic view of the embodiment of FIG. 1 and shows the alignment of optical fibers in an original position.

FIGS. 7 and 8 depict a typical use for the bypass switch of the invention, that is, when a failed node must be bypassed. FIG. 7 is a schematic diagram showing the fiber optic switch of the invention in an original position, wherein fibers 24, 26, 28 of first body 16 are aligned with fibers 30, 32, 24 of second body 18. In the event node 110 fails, solenoid 24 is actuated so that fibers 30, 32, 34 of second body 18 are rotated 120° with respect to fibers 24, 26, 28 of first body 16. Referring to FIG. 8, fibers 24, 26, 28 are realigned with fibers 32, 34, 30, respectively, thereby bypassing failed node 110.

Figure 9:
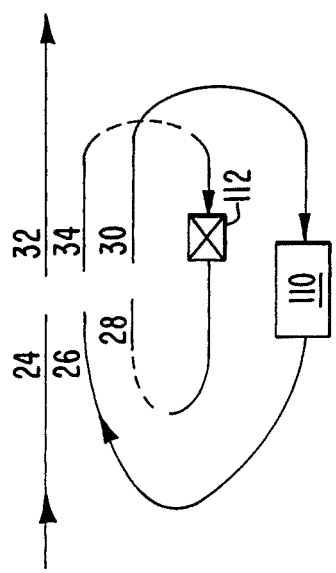
FIG. 9 is a schematic view of the embodiment of the invention having three fibers in each ferrule and shows an additional feature of the invention.

An additional feature of the switch of the invention is that it may be "fully reversing". This feature is shown schematically in FIG. 9. Referring to FIG. 9, when node 110 is bypassed, the "unused" fibers 28 and 34 may be connected to provide a self-test of node 110 before node 110 is reconnected to the main fiber path. Connector 112 is provided to pass only a fraction of the signal to node 110. Reducing the signal to node 110 tests node 110 by insuring that node 110 works even with a very reduced signal.

Other embodiments of the invention will be apparent to one skilled in the art from consideration of the specification and practice of the invention disclosed herein. For example, although a standard two position rotational switch is shown in the present application, a multi-position switch is also contemplated and would be encompassed by the claims. Accordingly, it is intended that the specification and examples be considered as exemplary only, with a true scope and spirit of the invention being indicated by the following claims.

What is claimed is:

1. A rotary optical fiber switch comprising:
   first and second bodies each having a first end and a second end and a single axial bore extending therebetween, said bore having an inner wall and being adapted to receive a plurality of optical fibers dimensioned to fit in contiguous relation with each other and said inner wall for precise positioning within said bore, and said bore being adapted to locate first ends of said fibers in substantially coplanar relation with the respective first ends of said first and second bodies;
   means for mounting said first body in a fixed predetermined orientation;
   means for positioning said second body in predetermined coaxial relation to said first body, the first ends of said bodies being disposed in substantially abutting relation, said positioning means including means for permitting rotation of said second body about its axis; and
   means for selectively rotating said second body between predetermined angular positions, the first end of each fiber in the second body being in optical-transmission alignment with the first end of one fiber in the first body in each said position.

2. The rotary optical fiber switch of claim 1, further comprising securing means for securing said plurality of fibers in said precise position within said bore.

3. The rotary optical fiber switch of claim 2, wherein said securing means includes an adhesive for adhering each of said positioned fibers to each other and to the inner wall of said bore.

4. The rotary optical fiber switch of claim 3, wherein each of said plurality of fibers has a central axis substantially equidistant from a central axis of its corresponding bore.

5. The optical fiber switch of claim 4, wherein each optical fiber includes a glass core and an outer glass cladding.

6. The optical fiber switch of claim 5, wherein a portion of each of said optical fibers disposed outside of the respective first and second bodies includes a protective plastic coating and wherein a portion of each of said optical fibers disposed within the respective first and second bodies includes exposed outer glass cladding.

7. The optical fiber switch of claim 6, wherein said adhesive fills the spaces between said fibers and said inner wall for adhering each of the optical fibers to the corresponding inner wall at the exposed outer glass cladding portion of the optical fiber.

8. The optical fiber switch of claim 7, wherein said positioning means includes a cylindrical collar having an axial bore for guidingly receiving said first ends of said first and second bodies in said virtually abutting relation, said collar surrounding portions of said first and second bodies including the abutting first ends of said bodies.

9. The optical fiber switch of claim 8, wherein said positioning means further includes means for fixing said cylindrical collar to said first body, the cylindrical collar surrounding at least a portion of the rotating second body for axially aligning the first and second bodies with respect to each other.

10. The optical fiber switch of claim 9, wherein said positioning means further includes means for axially biasing said second body toward said first body in said virtually abutting relation.

11. The optical fiber switch of claim 1, wherein said selective rotating means includes means for rotating said second body and means for stopping rotation of said second body at a predetermined angular position.

12. The optical fiber switch of claim 11, wherein said rotating means includes:
   a cam fixed to said second body for rotating therewith;
   means for driving said cam; and
   means for operatively connecting said driving means and said cam.

13. The optical fiber switch of claim 12, wherein said stopping means includes adjustable stops positioned to abut said rotating cam at adjustable predetermined angular positions of said cam.

14. The optical fiber switch of claim 12, wherein said connecting means includes a two-armed pivoting apparatus connected at one arm to said driving means and connected at the other arm to said cam, said driving means pivoting the two-armed pivoting apparatus to thereby rotate said cam.

15. The optical fiber switch of claim 14, wherein said cam includes a projection extending radially from said second body and having a radial slot therein, and wherein said connecting means includes an extension having one end fixed to said other arm of said pivoting apparatus and the other end movably disposed in said slot, said pivoting of said pivoting apparatus causing said second body.

16. The optical fiber switch of claim 1, wherein each bore of the first and second bodies contains three optical fibers and wherein said second body is rotated 120° to change the alignment of the fibers in the second body with respect to the fibers in the first body.

17. The optical fiber switch of claim 3, wherein said adhesive is epoxy cement.

18. The optical fiber switch of claim 1, wherein said positioning means includes a cylindrical collar having an axial bore or guidingly receiving said first ends of said first and second portions of said first and second bodies including the abutting first ends of said bodies.

19. The optical fiber switch of claim 18, wherein said positioning means further includes means for fixing said cylindrical collar to said first body, the cylindrical collar surrounding at least a portion of the rotating second body for axially aligning the first and second bodies with respect to each other.

20. The optical fiber switch of claim 19, wherein said positioning means further includes means for axially biasing said second body toward said first body in said virtually abutting relation.

* * * * *

UNITED STATES PATENT AND TRADEMARK OFFICE
CERTIFICATE OF CORRECTION

PATENT NO. : 4,946,247

DATED : August 7, 1990

INVENTOR(S) : Muska and Couch

It is certified that error appears in the above-identified patent and that said Letters Patent is hereby corrected as shown below:

Claim 15, col. 8, line 44, after "said" insert --extension to slide within said slot and rotate said cam and said--.

Claim 18, col. 8, line 55, before "portions", insert --bodies in said virtually abutting relation, said collar surrounding--.

Signed and Sealed this

Sixth Day of August, 1991

Attest:

HARRY F. MANBECK, JR.

Attesting Officer

Commissioner of Patents and Trademarks